US010260600B2

(12) United States Patent
Ueda et al.

(10) Patent No.: US 10,260,600 B2
(45) Date of Patent: Apr. 16, 2019

(54) AUTOMATIC TRANSMISSION (71) Applicant: MAZDA MOTOR CORPORATION, Aki-gun, Hiroshima (JP)

(72) Inventors: Kensuke Ueda, Hiroshima (JP); Narihito Hongawara, Hiroshima (JP); Tatsuhiko Iwasaki, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 138 days.

(21) Appl. No.: 15/514,818

(22) PCT Filed: Nov. 19, 2015

(86) PCT No.: PCT/JP2015/005794
§ 371 (c)(1),
(2) Date: Mar. 27, 2017

(87) PCT Pub. No.: WO2016/092751
PCT Pub. Date: Jun. 16, 2016

(65) Prior Publication Data
US 2017/0234410 A1    Aug. 17, 2017

(30) Foreign Application Priority Data
Dec. 10, 2014    (JP) ................................. 2014-250034

(51) Int. Cl.
*F16H 3/66* (2006.01)
*F16H 57/10* (2006.01)
(Continued)

(52) U.S. Cl.
CPC ........... *F16H 3/66* (2013.01); *F16D 25/0638* (2013.01); *F16H 57/10* (2013.01); *F16H 61/30* (2013.01);
(Continued)

(58) Field of Classification Search
CPC .......... F16H 3/66; F16H 57/10; F16H 61/006; F16H 2200/006; F16H 2200/2012; F16H 2200/2043; F16D 25/0638
See application file for complete search history.

(56) References Cited

U.S. PATENT DOCUMENTS

2007/0066440 A1\*  3/2007  Kitahara ............... F16H 57/043
                                                                 475/331
2012/0088628 A1   4/2012  Ziemer et al.

FOREIGN PATENT DOCUMENTS

EP          2438324 B1      7/2013

OTHER PUBLICATIONS

ISA Japan Patent Office, International Search Report and Written Opinion Issued in Application No. PCT/JP2015/005794, dated Feb. 16, 2016, WIPO, 6 pages.

\* cited by examiner

*Primary Examiner* — Mark J Beauchaine
(74) *Attorney, Agent, or Firm* — Alleman Hall Creasman & Tuttle LLP (57) ABSTRACT

An automatic transmission includes: a brake device including a friction plate set configured with fixation friction plates and rotation friction plates alternately arranged, a piston, and an oil pressure chamber supplied with oil pressure that moves the piston toward the friction plate set side; a first rotating member; and second and third rotating members arranged at both respective axial sides of the first rotating member and each having an outer diameter smaller than that of the first rotating member. The friction plate set and the oil pressure chamber are arranged at both respective axial sides of the first rotating member and also arranged at an outer periphery side of the second rotating member and at the outer periphery side of the third rotating member, respectively. The piston extends from the oil pressure chamber (Continued)

toward the friction plate set side through the outer periphery side of the first rotating member.

5 Claims, 4 Drawing Sheets

(51) Int. Cl.
| | |
|---|---|
| *F16D 25/0638* | (2006.01) |
| *F16H 61/30* | (2006.01) |
| *F16H 63/30* | (2006.01) |
| F16H 57/08 | (2006.01) |
| F16D 55/40 | (2006.01) |
| F16D 121/04 | (2012.01) |

(52) U.S. Cl.
CPC ......... *F16H 63/3026* (2013.01); *F16D 55/40* (2013.01); *F16D 2121/04* (2013.01); *F16H 57/08* (2013.01); *F16H 2057/087* (2013.01); *F16H 2200/006* (2013.01); *F16H 2200/2012* (2013.01); *F16H 2200/2043* (2013.01)

AUTOMATIC TRANSMISSION

TECHNICAL FIELD

The present invention relates to an automatic transmission mounted on a vehicle and belongs to a technical field of transmissions for vehicles.

BACKGROUND ART

An automatic transmission mounted on a vehicle, such as an automobile, typically includes a transmission mechanism including: a plurality of planetary gear sets (planetary gear mechanisms); and a plurality of friction engaging elements, such as a clutch device and a brake device. The automatic transmission is configured such that by selectively engaging the friction engaging elements, power transmission paths passing through the planetary gear sets are switched, and as a result, a predetermined gear stage corresponding to a driving state of the vehicle is realized.

In recent years, for the purpose of improving fuel efficiency of the vehicle and the like, an increase in the number of gear stages in the automatic transmission has been advanced, and in accordance with this, the number of planetary gear sets constituting the transmission mechanism tends to increase. However, when the number of planetary gear sets increases, an axial size of the entire automatic transmission increases, and this causes a problem regarding mountability to a vehicle. Especially in a transversely mounted type automatic transmission having a center axis extending in a vehicle body width direction, an interference of the automatic transmission with a frame member of a vehicle body or the like tends to be a problem, so that the problem regarding the mountability to the vehicle may become more significant.

Here, for example, PTL 1 discloses an automatic transmission in which two planetary gear sets constituting the transmission mechanism are arranged so as to overlap each other when viewed from a radial direction. According to this, the axial size of the entire automatic transmission can be made smaller than the axial size of an automatic transmission in which two planetary gear sets are arranged so as to be lined up in an axial direction.

Further, PTL 1 discloses an automatic transmission in which: one planetary gear set is adjacently arranged at one axial side of the two planetary gear sets arranged so as to overlap each other when viewed from the radial direction; and a brake device is arranged at an outer periphery side of the one planetary gear set.

CITATION LIST

Patent Literature

PTL 1: European Patent No. 2,438,324, Description

SUMMARY OF INVENTION

Technical Problem

To be specific, in the automatic transmission described in PTL 1, a rotating member having a large outer diameter is adjacently arranged at one axial side of the brake device. In such a case, if a vertical wall portion of a transmission casing or another rotating member having a large outer diameter is adjacently arranged at the other axial side of the brake device, the members are adjacently arranged at both axial sides of the brake device.

Therefore, in the case of using a tandem type brake device including a clearance adjustment piston in addition to an engagement piston, a brake device including a friction plate set in which the number of friction plates is increased, or the like, the axial size of the brake device is long, so that the axial size of the entire automatic transmission may become long.

An object of the present invention is to provide an automatic transmission configured compactly in an axial direction.

Solution to Problem

To achieve the above object, an automatic transmission according to the present invention is configured as follows.

A first aspect of the present invention of the present application is an automatic transmission including: a brake device including a friction plate set configured such that fixation friction plates and rotation friction plates are alternately arranged, a piston, and an oil pressure chamber supplied with oil pressure that moves the piston toward the friction plate set side; a predetermined first rotating member; a predetermined second rotating member arranged at one axial side of the first rotating member and having an outer diameter smaller than an outer diameter of the first rotating member; and a predetermined third rotating member arranged at the other axial side of the first rotating member and having an outer diameter smaller than the outer diameter of the first rotating member, wherein: the friction plate set is arranged at the one axial side of the first rotating member and at an outer periphery side of the second rotating member; a part of the oil pressure chamber or the entire oil pressure chamber is arranged at the other axial side of the first rotating member and at the outer periphery side of the third rotating member; and the piston extends from the oil pressure chamber toward the friction plate set side through the outer periphery side of the first rotating member.

A second aspect of the present invention is the automatic transmission according to the first aspect of the present invention, the automatic transmission including: an inner periphery side planetary gear set; and an outer periphery side planetary gear set located at the outer periphery side of the inner periphery side planetary gear set, the inner and outer periphery side planetary gear sets each including a sun gear, a ring gear, and a carrier and being arranged so as to overlap each other when viewed from a radial direction, wherein the first rotating member serves as the ring gear of the outer periphery side planetary gear set.

A third aspect of the present invention is the automatic transmission according to the first or second aspect of the present invention, the automatic transmission including: an inner periphery side planetary gear set; an outer periphery side planetary gear set located at the outer periphery side of the inner periphery side planetary gear set, the inner and outer periphery side planetary gear sets each including a sun gear, a ring gear, and a carrier and being arranged so as to overlap each other when viewed from a radial direction; and a power transmission member provided across the outer periphery side of the outer periphery side planetary gear set, wherein the first rotating member includes the power transmission member.

A fourth aspect of the present invention is the automatic transmission according to any one of the first to third aspects of the present invention, wherein: the piston includes an engagement piston configured to cause the fixation friction plates and the rotation friction plates to be engaged with each other and a clearance adjustment piston configured to adjust a clutch clearance; the oil pressure chamber includes an engagement oil pressure chamber supplied with oil pressure that moves the engagement piston toward the friction plate set side and a clearance adjustment oil pressure chamber supplied with oil pressure that moves the clearance adjustment piston toward the friction plate set side; one of the engagement oil pressure chamber and the clearance adjustment oil pressure chamber is arranged at the one axial side of the first rotating member and at the outer periphery side of the second rotating member; and the other of the engagement oil pressure chamber and the clearance adjustment oil pressure chamber is arranged at the other axial side of the first rotating member and at the outer periphery side of the third rotating member.

A fifth aspect of the present invention is the automatic transmission according to any one of the first to third aspects of the present invention, wherein: the piston includes an engagement piston configured to cause the fixation friction plates and the rotation friction plates to be engaged with each other and a clearance adjustment piston configured to adjust a clutch clearance; the oil pressure chamber includes an engagement oil pressure chamber supplied with oil pressure that moves the engagement piston toward the friction plate set side and a clearance adjustment oil pressure chamber supplied with oil pressure that moves the clearance adjustment piston toward the friction plate set side; and both the engagement oil pressure chamber and the clearance adjustment oil pressure chamber are arranged at the other axial side of the first rotating member and at the outer periphery side of the third rotating member.

Advantageous Effects of Invention

According to the first aspect of the present invention of the present application, in the above configuration, the friction plate set is arranged at one axial side of the first rotating member and at an outer periphery side of the second rotating member having an outer diameter smaller than an outer diameter of the first rotating member, and a part of the oil pressure chamber or the entire oil pressure chamber is arranged at the other axial side of the first rotating member and at the outer periphery side of the third rotating member. In addition, the piston extends from the oil pressure chamber toward the friction plate set side through the outer periphery side of the first rotating member. With this, as compared to a case where both the friction plate set and the oil pressure chamber are adjacently arranged at one axial side of the first rotating member, the automatic transmission can be configured compactly in the axial direction by effectively utilizing spaces at both axial sides of the first rotating member.

In a case where (i) the second or third rotating member having a small outer diameter is arranged adjacent to the first rotating member having a large outer diameter, (ii) the brake device is arranged at the outer periphery side of the second or third rotating member, and (iii) the vertical wall portion of the transmission casing and the like are arranged at an opposite side of the first rotating member across the brake device so as to be adjacent to the brake device, the automatic transmission can be configured compactly in the axial direction by effectively utilizing spaces at both axial sides of the first rotating member.

According to the second aspect of the present invention, the automatic transmission includes: the inner periphery side planetary gear set; and the outer periphery side planetary gear set located at the outer periphery side of the inner periphery side planetary gear set, the inner and outer periphery side planetary gear sets being arranged so as to overlap each other when viewed from the radial direction, and the first rotating member serves as the ring gear of the outer periphery side planetary gear set. With this, the friction plate set and oil pressure chamber of the brake device can be arranged by utilizing spaces at both axial sides of the outer periphery side planetary gear set arranged at the outer periphery side, and therefore, the above effect can be effectively obtained.

According to the third aspect of the present invention, the automatic transmission includes: the inner periphery side planetary gear set; the outer periphery side planetary gear set located at the outer periphery side of the inner periphery side planetary gear set, the inner and outer periphery side planetary gear sets being arranged so as to overlap each other when viewed from the radial direction; and the power transmission member provided across the outer periphery side of the outer periphery side planetary gear set, and the first rotating member includes the power transmission member. With this, even in a case where the power transmission member is arranged at the outer periphery side of the outer periphery side planetary gear set arranged at the outer periphery side, spaces at both axial sides of the first rotating member can be effectively utilized, and therefore, the above effect can be effectively obtained.

According to the fourth aspect of the present invention, the piston includes the engagement piston and the clearance adjustment piston, and the oil pressure chamber includes the engagement oil pressure chamber and the clearance adjustment oil pressure chamber. In addition, one of the engagement oil pressure chamber and the clearance adjustment oil pressure chamber is arranged at one axial side of the first rotating member and at the outer periphery side of the second rotating member, and the other of the engagement oil pressure chamber and the clearance adjustment oil pressure chamber is arranged at the other axial side of the first rotating member and at the outer periphery side of the third rotating member. With this, in the case of using the tandem type brake device, the engagement oil pressure chamber and the clearance adjustment oil pressure chamber can be arranged at both respective axial sides of the first rotating member, and therefore, the above effect can be effectively achieved.

According to the fifth aspect of the present invention, the piston includes the engagement piston and the clearance adjustment piston, and the oil pressure chamber includes the engagement oil pressure chamber and the clearance adjustment oil pressure chamber. In addition, both the engagement oil pressure chamber and the clearance adjustment oil pressure chamber are arranged at the other axial side of the first rotating member and at the outer periphery side of the third rotating member. With this, in the case of using the tandem type brake device, the friction plate set, the engagement oil pressure chamber, and the clearance adjustment oil pressure chamber can be arranged at spaces at both axial sides of the first rotating member, and therefore, the above effect can be effectively achieved.

DESCRIPTION OF EMBODIMENTS

Hereinafter, embodiments of the present invention will be explained.

Figure 1:
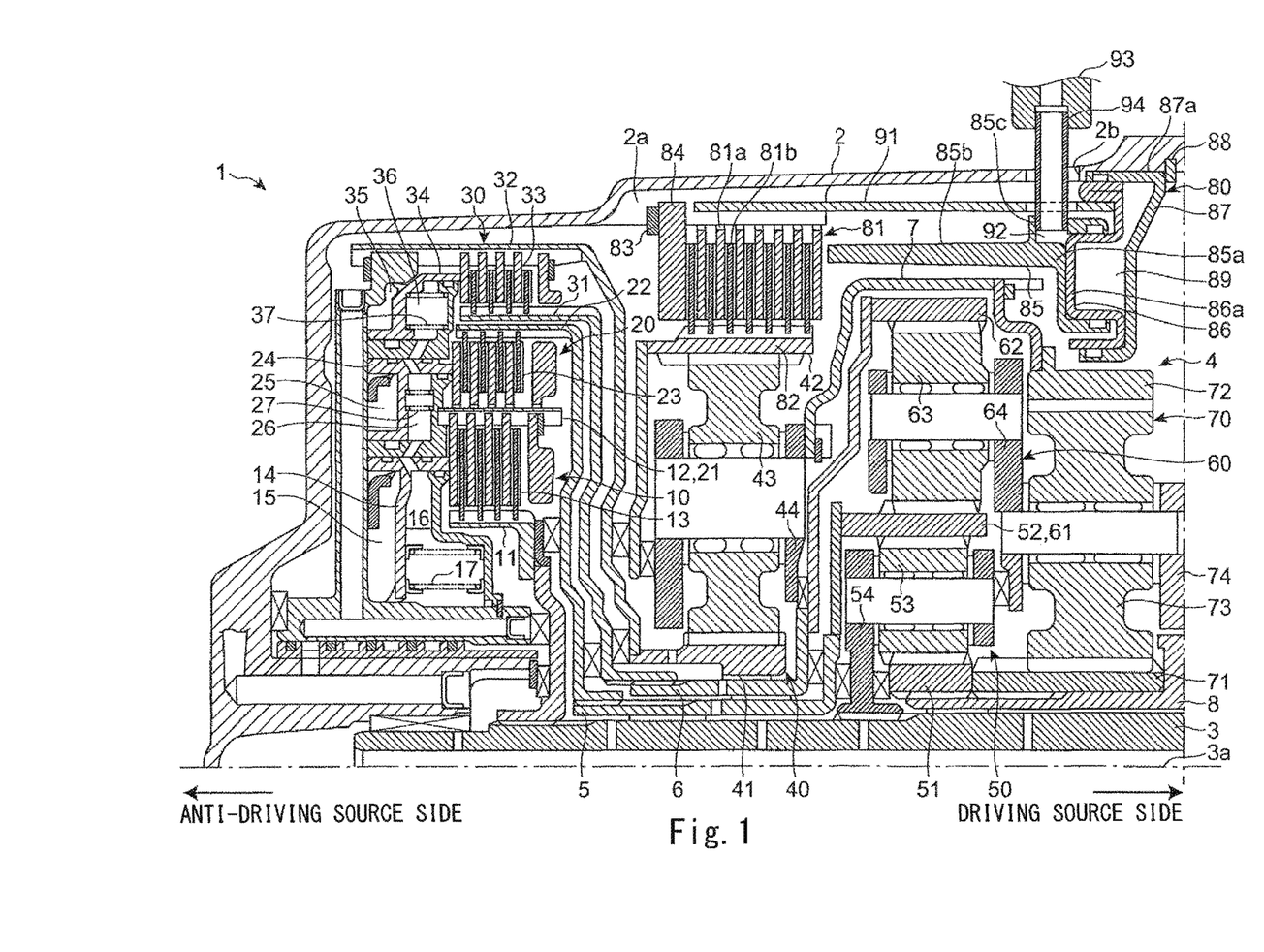
FIG. 1 is a cross-sectional view showing a rear portion of an automatic transmission according to Embodiment 1 of the present invention.
Figure 2:
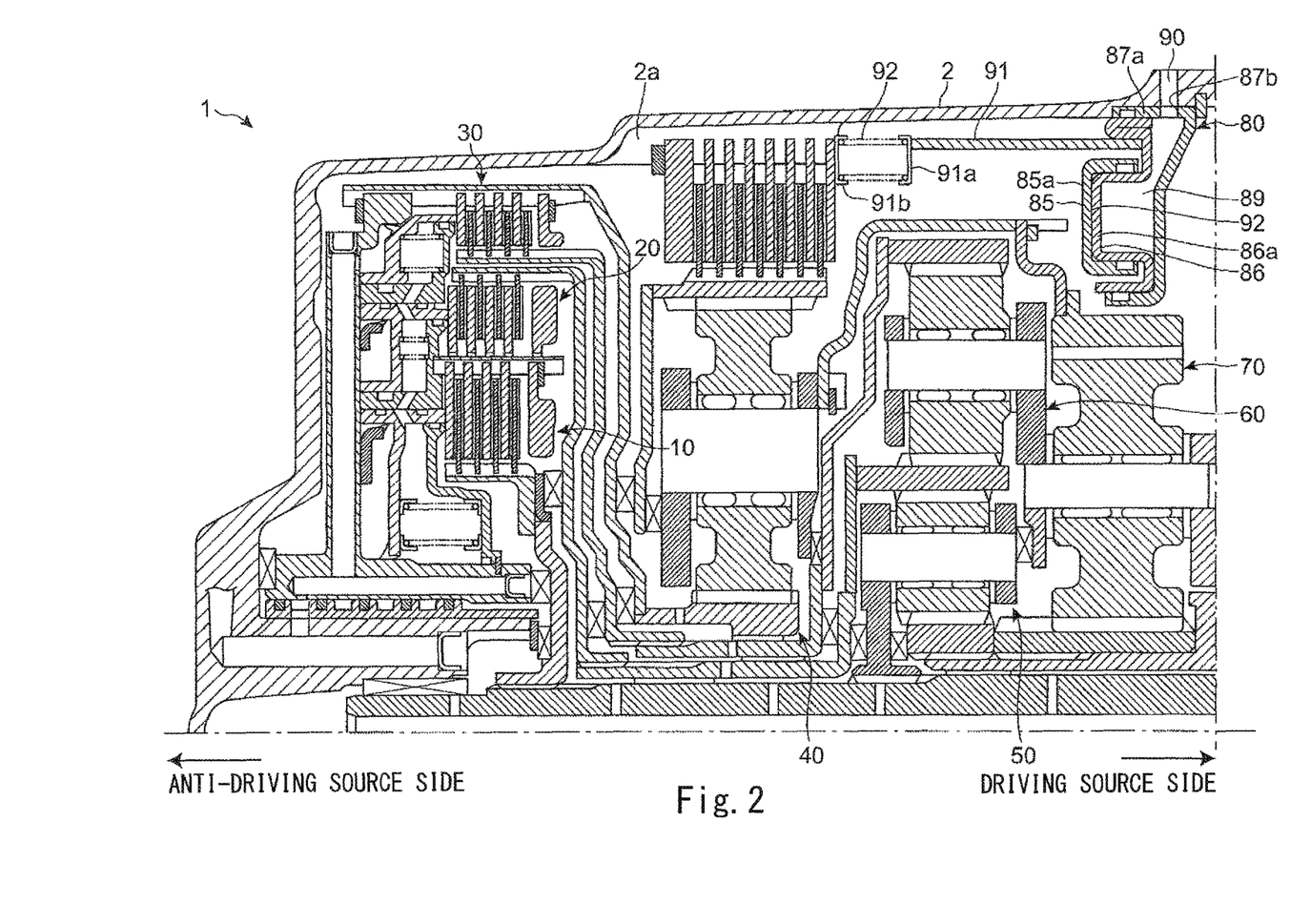
FIG. 2 is a cross-sectional view showing another cross section of the rear portion of the automatic transmission according to Embodiment 1 of the present invention.

FIG. 1 is a cross-sectional view showing a rear portion of an automatic transmission according to Embodiment 1 of the present invention. FIG. 2 is a cross-sectional view showing another cross section of the rear portion of the automatic transmission according to Embodiment 1 of the present invention. As shown in FIGS. 1 and 2, an automatic transmission 1 according to Embodiment 1 is a transversely mounted type automatic transmission for a front engine-front drive vehicle. A transmission mechanism 4 is included in a transmission casing 2 and includes a plurality of planetary gear sets and a plurality of friction engaging elements such as a clutch device and a brake device, and the planetary gear sets and the friction engaging elements are arranged on an axis 3a of an input shaft 3 coupled to a driving source such as an engine.

The automatic transmission 1 is configured such that power transmission paths passing through the plurality of planetary gear sets are switched by combining engaged states of the plurality of friction engaging elements, and thus, a change gear ratio of the transmission mechanism 4 is changed, and a predetermined gear stage is realized. For example, the transmission mechanism 4 includes four planetary gear sets and five friction engaging elements and is configured such that each of eight forward gear stages and one reverse gear stage is formed by selectively engaging three of these friction engaging elements.

In the present embodiment, the transmission mechanism 4 includes: first, second, and third clutch devices 10, 20, and 30 which are arranged at a rear portion of the transmission casing 2 at an anti-driving source side (hereinafter, the anti-driving source side is referred to as a rear side, and a driving source side is referred to as a front side), are located on the input shaft 3 extending from the driving source side, and overlap one another in order from a radially inner side toward a radially outer side; a first planetary gear set 40 arranged in front of the clutch devices 10, 20, and 30; second and third planetary gear sets 50 and 60 arranged in front of the first planetary gear set 40 so as to overlap each other when viewed from the radial direction and be located at a radially inner periphery side and a radially outer periphery side, respectively; a fourth planetary gear set 70 arranged in front of the second and third planetary gear sets 50 and 60; and a brake device 80 arranged at the outer periphery side of the planetary gear sets 40, 50, 60, and 70.

Each of the first, second, and third clutch devices 10, 20, and 30 includes: a hub member (11, 21, 31) that is an inner rotating member; a drum member (12, 22, 32) that is an outer rotating member; a plurality of friction plates (13, 23, 33) provided between the hub member (11, 21, 31) and the drum member (12, 22, 32) so as to be lined up in an axial direction and be alternately splined to the hub member (11, 21, 31) and the drum member (12, 22, 32); a piston (14, 24, 34) arranged at the anti-driving source side of the plurality of friction plates (13, 23, 33); and an engagement oil pressure chamber (15, 25, 35) arranged at the anti-driving source side of the piston (14, 24, 34).

When engagement oil pressure is supplied to the engagement oil pressure chamber (15, 25, 35), the piston (14, 24, 34) presses the friction plates (13, 23, 33) from the anti-driving source side to couple the hub member (11, 21, 31) and the drum member (12, 22, 32) with each other. Thus, the clutch device (10, 20, 30) is engaged.

Each of the first, second, and third clutch devices 10, 20, and 30 further includes a centrifugal cancel chamber (16, 26, 36) which is provided at an opposite side of the engagement oil pressure chamber (15, 25, 35) across the piston (14, 24, 34) and is supplied with operating oil that biases the piston (14, 24, 34) in a direction opposite to a direction toward the friction plates.

The centrifugal cancel chamber (16, 26, 36) prevents dragging of the friction plates (13, 23, 33), the dragging being caused since the piston (14, 24, 34) is pressed in the direction toward the friction plates by centrifugal force acting on oil pressure in the engagement oil pressure chamber (15, 25, 35) when the clutch device (10, 20, 30) is released. By the centrifugal force acting on the operating oil supplied to the centrifugal cancel chamber (16, 26, 36), the centrifugal cancel chamber (16, 26, 36) generates biasing force that biases the piston (14, 24, 34) in the direction opposite to the direction toward the friction plates, and this biasing force cancels pressing force acting in the direction toward the friction plates. Each of the centrifugal cancel chambers 16, 26, and 36 is provided with a return spring (17, 27, 37) that biases the piston (14, 24, 34) in the direction opposite to the direction toward the friction plates.

Each of the first, second, third, and fourth planetary gear sets (hereinafter referred to as "first, second, third, and fourth gear sets") 40, 50, 60, and 70 is a single pinion type planetary gear set and includes: a sun gear (41, 51, 61, 71); a ring gear (42, 52, 62, 72); a plurality of pinions (43, 53, 63, 73) which mesh with the sun gear (41, 51, 61, 71) and the ring gear (42, 52, 62, 72); and a carrier (44, 54, 64, 74) which supports the pinions (43, 53, 63, 73).

In the automatic transmission 1, the third gear set 60 is arranged at the outer periphery side of the second gear set 50 so as to overlap the second gear set 50. In addition, the ring gear 52 of the second gear set 50 and the sun gear 61 of the third gear set 60 are coupled to each other at all times, and the ring gear 52 of the second gear set 50 and the sun gear 61 of the third gear set 60 are integrated as a single component.

Each of the first and fourth gear sets 40 and 70, which are arranged at both axial sides of the second and third gear sets 50 and 60, respectively, has an outer diameter smaller than an outer diameter of the third gear set 60 arranged at the outer periphery side among the second and third gear sets 50 and 60. To be specific, each of the ring gear 42 of the first gear set 40 and the ring gear 72 of the fourth gear set 70 is formed so as to have an outer diameter smaller than an outer diameter of the ring gear 62 of the third gear set 60.

The following will explain coupling relations among the rotating members of the first, second, and third clutch devices 10, 20, and 30, the rotating members of the first, second, third, and fourth gear sets 40, 50, 60, and 70, and the other power transmission members.

The hub member 11 of the first clutch device 10 is coupled to the input shaft 3 at all times. The drum member 12 of the first clutch device 10 is formed integrally with the hub member 21 of the second clutch device 20 and is coupled to the drum member 32 of the third clutch device 30 and the sun gear 41 of the first gear set 40 at all times.

The drum member 22 of the second clutch device 20 is coupled to the ring gear 52 of the second gear set 50 and the sun gear 61 of the third gear set 60 at all times through a power transmission member 5 extending in the axial direction at the outer periphery side of the input shaft 3.

The hub member 31 of the third clutch device 30 is coupled to the ring gear 62 of the third gear set 60 at all times through a power transmission member 6. The power transmission member 6 extends in the axial direction at the outer periphery side of the power transmission member 5 provided at the outer periphery side of the input shaft 3. Further, the power transmission member 6 extends in the radial direction through between the first gear set 40 and a group of the second and third gear sets 50 and 60.

The ring gear 42 of the first gear set 40 is formed integrally with a hub member 82 that is a rotating member of the brake device 80 described later. The carrier 44 of the first gear set 40 is coupled to the ring gear 72 of the fourth gear set 70 at all times through a power transmission member 7. The power transmission member 7 extends in the axial direction across the outer periphery side of the ring gear 62 of the third gear set 60 and then extends in the radial direction at both axial sides of the third gear set 60.

The carrier 54 of the second gear set 50 is coupled to the input shaft 3 at all times. The sun gear 51 of the second gear set 50 and the sun gear 71 of the fourth gear set 70 are splined to and coupled at all times to a power transmission member 8 extending in the axial direction at the outer periphery side of the input shaft 3. A driving source side portion of the power transmission member 8 is coupled to, for example, the other rotating member arranged at the driving source side of the fourth gear set 70.

Next, the brake device 80 arranged at the outer periphery side of the first, second, third, and fourth gear sets 40, 50, 60, and 70 will be explained.

The brake device 80 includes a friction plate set 81 configured such that a plurality of fixation friction plates 81$a$ and a plurality of rotation friction plates 81$b$ are alternately arranged. Each of the plurality of fixation friction plates 81$a$ is configured such that an outer peripheral portion thereof is engaged with a spline 2$a$ formed on an inner peripheral surface of the transmission casing 2. Each of the plurality of rotation friction plates 81$b$ is configured such that an inner peripheral portion thereof is engaged with a spline formed on an outer peripheral surface of the hub member 82 serving as the rotating member. The hub member 82 is formed integrally with the ring gear 42 of the first gear set 40.

A retaining plate 84 is provided at the anti-driving source side of the friction plate set 81. The retaining plate 84 is engaged with the spline 2$a$ of the transmission casing 2 as with the fixation friction plates 81$a$ and is prevented from coming out rearward by a snap ring 83.

An engagement piston 85, a clearance adjustment piston 86, and a cylinder 87 are provided in order in front of the friction plate set 81. The engagement piston 85 causes the fixation friction plates 81$a$ and the rotation friction plates 81$b$ to be engaged with each other. The clearance adjustment piston 86 moves the engagement piston 85 toward the friction plate set side to adjust a clutch clearance (a value obtained by subtracting a sum of thicknesses of all the friction plates 81$a$ and 81$b$ from a size between the engagement piston 85 and the retaining plate 84). The cylinder 87 accommodates the pistons 85 and 86.

The cylinder 87 is constituted by a ring-shaped member having a substantially U-shaped cross section. The cylinder 87 is prevented from rotating in such a manner that an outer peripheral surface portion 87$a$ thereof is fitted in an inner peripheral surface of the transmission casing 2, and a projection (not shown) provided at the outer peripheral surface portion 87$a$ is engaged with the transmission casing 2. In addition, the cylinder 87 is prevented from coming out forward by a snap ring 88.

The clearance adjustment piston 86 includes a swelling portion 86$a$ that swells toward the friction plate set side and has a substantially U-shaped cross section. The clearance adjustment piston 86 is slidably and oil-tightly fitted in the cylinder 87. A clearance adjustment oil pressure chamber 89 supplied with oil pressure that moves the clearance adjustment piston 86 toward the friction plate set side is formed by the cylinder 87 and the clearance adjustment piston 86.

As shown in FIG. 2, the transmission casing is provided with an adjustment oil pressure supply passage 90 which penetrates the transmission casing 2 and is connected to an opening portion 87$b$ provided at the outer peripheral surface portion 87$a$ of the cylinder 87. Predetermined clearance adjustment oil pressure is supplied to the clearance adjustment oil pressure chamber 89 through the adjustment oil pressure supply passage 90 and the opening portion 87$b$.

The clearance adjustment piston 86 is provided with a stopper member 91 configured such that: a stroke of the clearance adjustment piston 86 toward the friction plate set side when the clearance adjustment oil pressure is supplied to the clearance adjustment oil pressure chamber 89 is restricted at a position where a predetermined clutch clearance is realized; and the clutch clearance is set as small as possible.

The stopper member 91 is fixed to the clearance adjustment piston 86 at the friction plate set side and is formed in a comb shape extending toward the friction plate set side. A tip end of the stopper member 91 faces a front surface of the retaining plate 84. When the clearance adjustment oil pressure is supplied to the clearance adjustment oil pressure chamber 89, the stopper member 91 contacts the retaining plate 84 to realize the predetermined clutch clearance.

As shown in FIG. 2, the stopper member 91 is provided with front spring receiving portions 91$a$ arranged at plural positions in a circumferential direction and extending in the radial direction, and the transmission casing 2 is provided with rear spring receiving portions 91$b$ facing the respective front spring receiving portions 91$a$, arranged at plural positions in the circumferential direction, and extending in the radial direction. Each of return springs 92 of the clearance adjustment piston 86 is attached between the front and rear spring receiving portions 91$a$ and 91$b$ facing each other.

The engagement piston 85 includes: a base portion 85$a$ that is depressed toward the friction plate set side and has a substantially U-shaped cross section; and an extending portion 85$b$ extending in the axial direction from the base portion 85$a$ toward the friction plate set side. The swelling portion 86$a$ of the clearance adjustment piston 86 is slidably and oil-tightly fitted in the base portion 85$a$. An engagement oil pressure chamber 92 supplied with oil pressure that moves the engagement piston 85 toward the friction plate set side is formed by the clearance adjustment piston 86 and the engagement piston 85.

As shown in FIG. 1, an oil supply pipe 94 extending from an oil pressure supply device 93 arranged outside the transmission casing 2 penetrates an opening portion 2$b$ of the transmission casing 2 to be connected to an oil supply port 85$c$ provided at the base portion 85$a$ of the engagement piston 85. Predetermined engagement oil pressure is supplied to the engagement oil pressure chamber 92 through the oil supply pipe 94.

According to the brake device 80, when the clearance adjustment oil pressure is supplied to the clearance adjustment oil pressure chamber 89, the clearance adjustment piston 86 moves toward the friction plate set side, and the engagement piston 85 moves toward the friction plate set side by the clearance adjustment piston 86. Thus, the predetermined clutch clearance is realized.

When the engagement oil pressure is supplied to the engagement oil pressure chamber 92 in a state where the clearance adjustment oil pressure is supplied to the clearance adjustment oil pressure chamber 89, the engagement piston 85 moves toward the friction plate set side, and the fixation friction plates 81a and the rotation friction plates 81b are sandwiched between the engagement piston 85 and the retaining plate 84. With this, the brake device 80 is engaged, and the hub member 82 or the ring gear 42 of the first gear set 40 is fixed.

As shown in FIGS. 1 and 2, the brake device 80 configured as above is arranged at the outer periphery side of the ring gear 62 of the third gear set 60, at the outer periphery side of the ring gear 42 of the first gear set 40, and at the outer periphery side of the ring gear 72 of the fourth gear set 70, the ring gears 42 and 72 being arranged at both respective axial sides of the ring gear 62 of the third gear set 60 and each having the outer diameter smaller than the outer diameter of the ring gear 62. Further, the brake device 80 is arranged at the outer periphery side of the power transmission member 7 provided across the outer periphery side of the ring gear 62 of the third gear set 60.

Specifically, according to the brake device 80, the friction plate set 81 is arranged at the anti-driving source side of the ring gear 62 and the power transmission member 7, and the engagement oil pressure chamber 92 and the clearance adjustment oil pressure chamber 89 are arranged at the driving source side of the ring gear 62 and the power transmission member 7. Further, the engagement piston 85 extends from the engagement oil pressure chamber 92 toward the friction plate set side through the outer periphery side of the ring gear 62 and the power transmission member 7 and the inner periphery side of the transmission casing 2.

With this, as compared to a case where the friction plate set 81, the engagement oil pressure chamber 92, and the clearance adjustment oil pressure chamber 89 are arranged at the anti-driving source side or driving source side of the ring gear 62 and the power transmission member 7, the automatic transmission 1 can be configured compactly in the axial direction by effectively utilizing spaces at both axial sides of the ring gear 62 and the power transmission member 7.

The brake device 80 is a tandem type brake device including: the engagement piston 85 and the clearance adjustment piston 86 as pistons; and the engagement oil pressure chamber 92 and the clearance adjustment oil pressure chamber 89 as oil pressure chambers. However, the brake device may be configured such that: the brake device includes only one piston and only one oil pressure chamber; the friction plate set and the oil pressure chamber are arranged at both respective axial sides of the ring gear 62 and the power transmission member 7 and at the outer periphery side of the ring gear 42 of the first gear set 40 and the ring gear 72 of the fourth gear set 70; and the piston extends from the oil pressure chamber toward the friction plate set side through the outer periphery side of the ring gear 62 and the power transmission member 7 and the inner periphery side of the transmission casing 2.

As above, in the automatic transmission 1 according to the present embodiment, the friction plate set 81 and oil pressure chambers 89 and 92 of the brake device 80 are arranged at both axial sides of the first rotating members 62 and 7 and at the outer periphery side of the second and third rotating members 42 and 72 each having the outer diameter smaller than the outer diameter of each of the first rotating members 62 and 7, and the piston 85 of the brake device 80 extends from the oil pressure chamber 92 toward the friction plate set side through the outer periphery side of the first rotating members 62 and 7. With this, as compared to a case where the friction plate set 81 and the oil pressure chambers 89 and 92 are adjacently arranged at one axial side of the first rotating members 62 and 7, the automatic transmission 1 can be configured compactly in the axial direction by effectively utilizing spaces at both axial sides of the first rotating members 62 and 7.

In a case where (i) the second or third rotating member having a small outer diameter is arranged adjacent to the first rotating member having a large outer diameter, (ii) the brake device is arranged at the outer periphery side of the second or third rotating member, and (iii) the vertical wall portion of the transmission casing and the like are arranged at an opposite side of the first rotating member across the brake device so as to be adjacent to the brake device, the automatic transmission can be configured compactly in the axial direction by effectively utilizing spaces at both axial sides of the first rotating member.

The automatic transmission 1 according to the present embodiment includes the inner periphery side planetary gear set 50 and the outer periphery side planetary gear set 60 located at the outer periphery side of the inner periphery side planetary gear set 50, the inner periphery side planetary gear set 50 and the outer periphery side planetary gear set 60 overlapping each other when viewed from the radial direction. In addition, the first rotating member is the ring gear 62 of the outer periphery side planetary gear set 60. With this, the friction plate set 81 and oil pressure chambers 89 and 92 of the brake device 80 can be arranged by utilizing spaces at both axial sides of the outer periphery side planetary gear set 60 arranged at the outer periphery side.

The automatic transmission 1 according to the present embodiment includes: the inner periphery side planetary gear set 50; the outer periphery side planetary gear set 60 located at the outer periphery side of the inner periphery side planetary gear set 50, the inner periphery side planetary gear set 50 and the outer periphery side planetary gear set 60 overlapping each other when viewed from the radial direction; and the power transmission member 7 provided across the outer periphery side of the outer periphery side planetary gear set 60, and the first rotating member includes the power transmission member 7. With this, even in a case where the power transmission member 7 is arranged at the outer periphery side of the outer periphery side planetary gear set 60 arranged at the outer periphery side, spaces at both axial sides of the first rotating member can be effectively utilized.

The piston of the automatic transmission 1 according to the present embodiment includes the engagement piston 85 and the clearance adjustment piston 86, and the oil pressure chamber of the automatic transmission 1 according to the present embodiment includes the engagement oil pressure chamber 92 and the clearance adjustment oil pressure chamber 89. In addition, both the engagement oil pressure chamber 92 and the clearance adjustment oil pressure chamber 89 are arranged at the other axial side of the first rotating members 62 and 7 and at the outer periphery side of the third rotating member 72. With this, in the case of using the tandem type brake device, the friction plate set 81, the engagement oil pressure chamber 92, and the clearance adjustment oil pressure chamber 89 can be arranged at spaces at both axial sides of the first rotating members 62 and 7.

Figure 3:
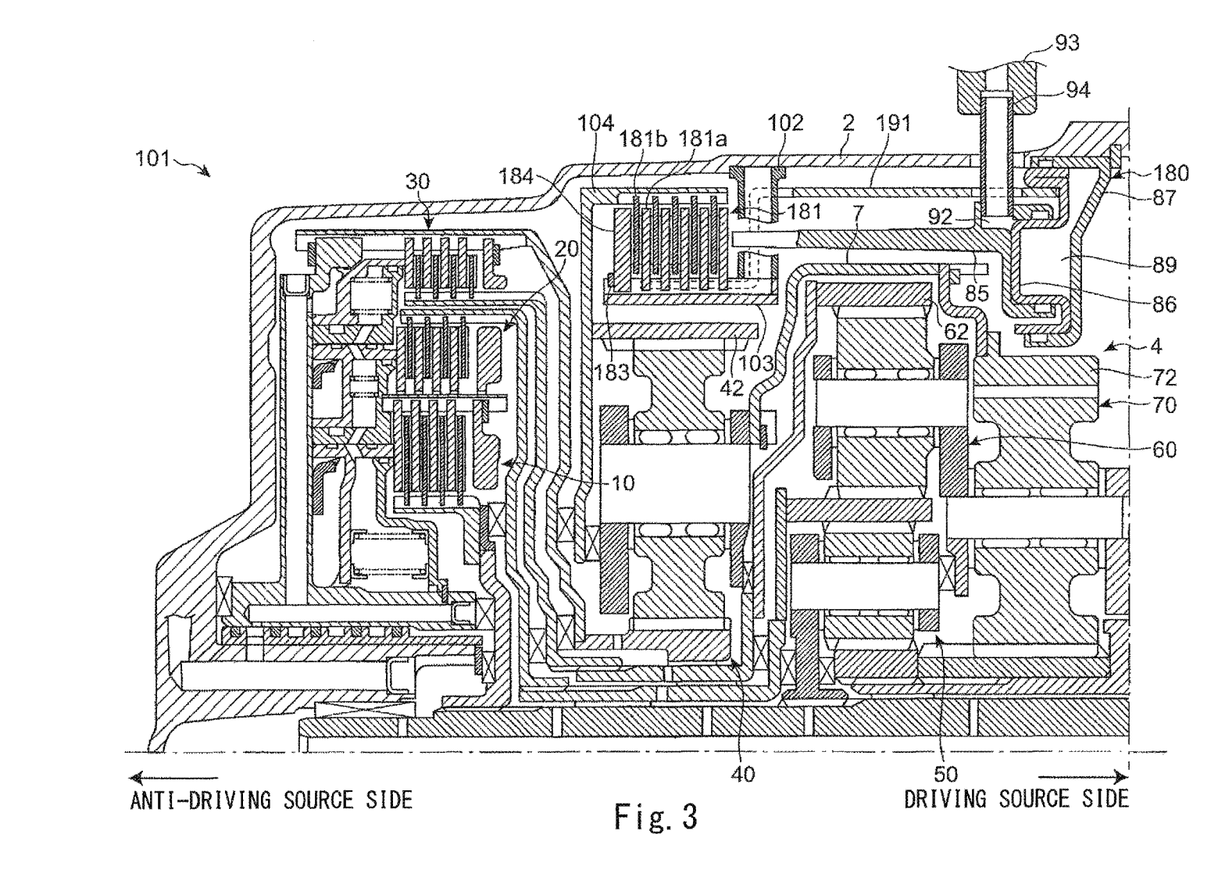
FIG. 3 is a cross-sectional view showing the rear portion of the automatic transmission according to Embodiment 2 of the present invention.

FIG. 3 is a cross-sectional view showing the rear portion of the automatic transmission according to Embodiment 2 of the present invention. An automatic transmission 101 according to Embodiment 2 is similar to the automatic transmission 1 according to Embodiment 1 except for the brake device. Therefore, the same reference signs are used for the same components, and explanations thereof are omitted.

In the automatic transmission 101, a friction plate set 181 is arranged at the anti-driving source side of the ring gear 62 and the power transmission member 7, and the engagement oil pressure chamber 92 and the clearance adjustment oil pressure chamber 89 are arranged at the driving source side of the ring gear 62 and the power transmission member 7. In addition, the engagement piston 85 extends from the engagement oil pressure chamber 92 toward the friction plate set side through the outer periphery side of the ring gear 62 and the power transmission member 7 and the inner periphery side of the transmission casing 2.

In the automatic transmission 101, fixation friction plates 181a constituting the friction plate set 181 are engaged with splines formed on an outer peripheral surface of a hub member 103 fixed to an inner peripheral surface of the transmission casing 2 through coupling members 102 provided at plural positions in the circumferential direction, and rotation friction plates 181b constituting the friction plate set 181 are engaged with splines formed on an inner peripheral surface of a drum member 104 that is a rotating member which is coupled to the ring gear 42 of the first gear set 40 at the anti-driving source side, extends in the radial direction, and then extends in the axial direction at the outer periphery side of the hub member 103.

A retaining plate 184 is provided at the anti-driving source side of the friction plate set 181. The retaining plate 184 is engaged with the spline of the hub member 103 as with the fixation friction plates 181a and is prevented from coming out rearward by a snap ring 183.

A stopper member 191 provided at the clearance adjustment piston 86 is fixed to the clearance adjustment piston 86 at the friction plate set side and is formed in a comb shape extending toward the friction plate set side. The stopper member 191 is formed to be small in the radial direction at the driving source side of the drum member 104. A tip end of the stopper member 191 faces a front surface of the retaining plate 184. When the clearance adjustment oil pressure is supplied to the clearance adjustment oil pressure chamber 89, the stopper member 191 contacts the retaining plate 184 to realize the predetermined clutch clearance.

Although not shown, a return spring configured to return the clearance adjustment piston 86 toward a side opposite to the anti-friction plate set side is attached to the stopper member 191 so as to be located between the stopper member 191 and the transmission casing 2.

According to a brake device 180, when the clearance adjustment oil pressure is supplied to the clearance adjustment oil pressure chamber 89, the clearance adjustment piston 86 moves toward the friction plate set side, and the engagement piston 85 moves toward the friction plate set side by the clearance adjustment piston 86. Thus, the predetermined clutch clearance is realized.

When the engagement oil pressure is supplied to the engagement oil pressure chamber 92 in a state where the clearance adjustment oil pressure is supplied to the clearance adjustment oil pressure chamber 89, the engagement piston 85 moves toward the friction plate set side, and the fixation friction plates 181a and the rotation friction plates 181b are sandwiched between the engagement piston 85 and the retaining plate 184. With this, the brake device 180 is engaged, and the drum member 104 or the ring gear 42 of the first gear set 40 is fixed.

As shown in FIG. 3, the brake device 180 configured as above is arranged at the outer periphery side of the ring gear 62 of the third gear set 60, at the outer periphery side of the ring gear 42 of the first gear set 40, and at the outer periphery side of the ring gear 72 of the fourth gear set 70, the ring gears 42 and 72 being arranged at both respective axial sides of the ring gear 62 of the third gear set 60 and each having the outer diameter smaller than the outer diameter of the ring gear 62. Further, the brake device 180 is arranged at the outer periphery side of the power transmission member 7 provided across the outer periphery side of the ring gear 62 of the third gear set 60.

Specifically, according to the brake device 180, the friction plate set 181 is arranged at the anti-driving source side of the ring gear 62 and the power transmission member 7, and the engagement oil pressure chamber 92 and the clearance adjustment oil pressure chamber 89 are arranged at the driving source side of the ring gear 62 and the power transmission member 7. Further, the engagement piston 85 extends from the engagement oil pressure chamber 92 toward the friction plate set side through the outer periphery side of the ring gear 62 and the power transmission member 7 and the inner periphery side of the transmission casing 2.

With this, as compared to a case where the friction plate set 181, the engagement oil pressure chamber 92, and the clearance adjustment oil pressure chamber 89 are arranged at the anti-driving source side or driving source side of the ring gear 62 and the power transmission member 7, the automatic transmission 101 can be configured compactly in the axial direction by effectively utilizing spaces at both axial sides of the ring gear 62 and the power transmission member 7.

Figure 4:
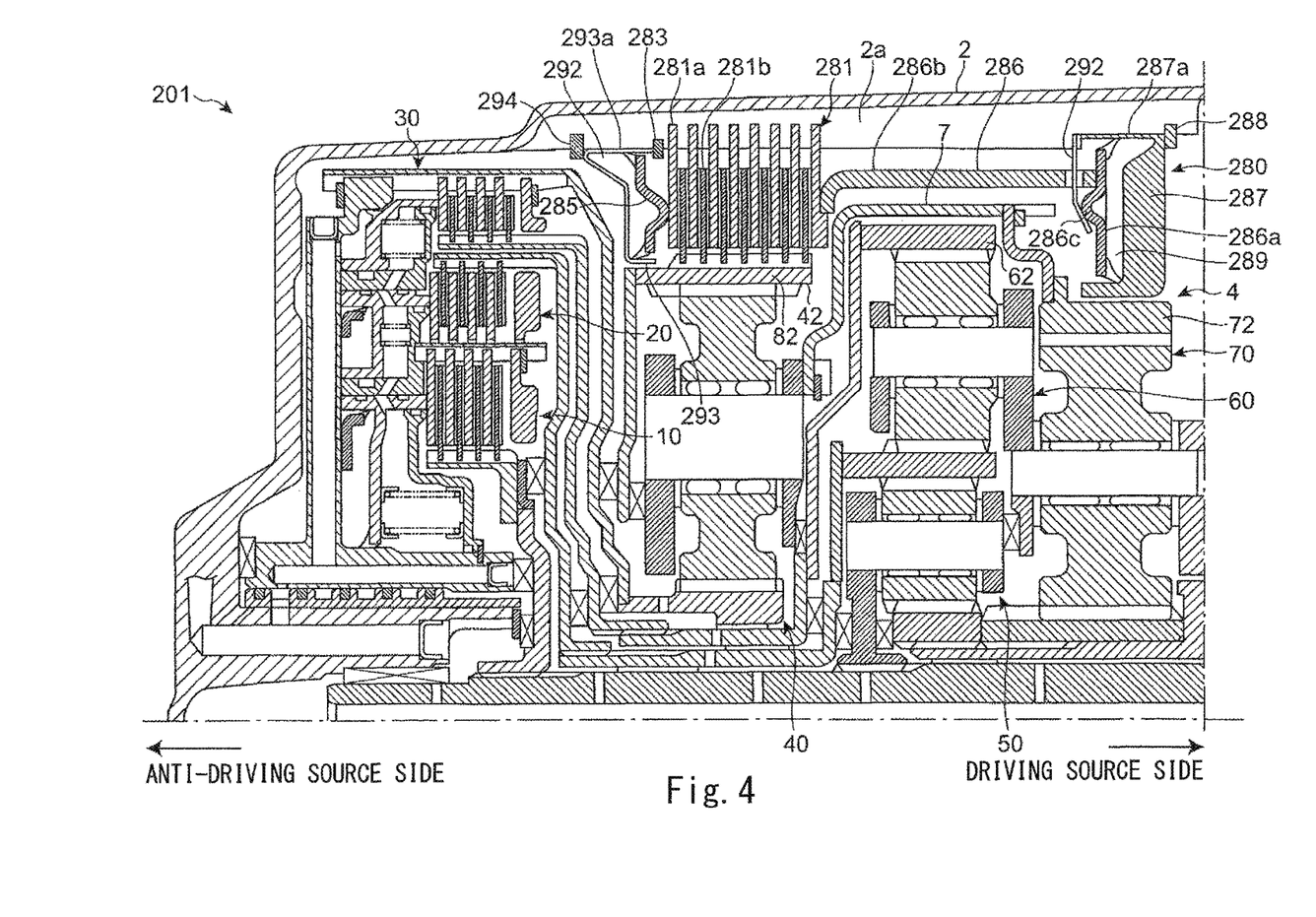
FIG. 4 is a cross-sectional view showing the rear portion of the automatic transmission according to Embodiment 3 of the present invention.

FIG. 4 is a cross-sectional view showing the rear portion of the automatic transmission according to Embodiment 3 of the present invention. An automatic transmission 201 according to Embodiment 3 is similar to the automatic transmission 1 according to Embodiment 1 except for the brake device. Therefore, the same reference signs are used for the same components, and explanations thereof are omitted.

In the automatic transmission 201, a brake device 280 includes: a friction plate set 281 configured such that fixation friction plates 281a and rotation friction plates 281b are alternately arranged; an engagement piston 285 configured to cause the fixation friction plates 281a and the rotation friction plates 281b to be engaged with each other; a clearance adjustment piston 286 configured to adjust the clutch clearance; an engagement oil pressure chamber 292 supplied with oil pressure that moves the engagement piston 285 toward the friction plate set side; and a clearance adjustment oil pressure chamber 289 supplied with oil pressure that moves the clearance adjustment piston 286 toward the friction plate set side.

In the automatic transmission 201, each of outer peripheral portions of the fixation friction plates 281a constituting the friction plate set 281 is engaged with the spline 2a formed on the inner peripheral surface of the transmission casing 2, and each of inner peripheral portions of the rotation friction plates 281b constituting the friction plate set 281 is engaged with the spline formed on the outer peripheral surface of the hub member 82.

A snap ring 283 is attached to the spline 2a of the transmission casing 2 at the anti-driving source side of the friction plate set 281. The snap ring 283 serves as a stopper member that realizes the predetermined clutch clearance when the clearance adjustment oil pressure is supplied to the clearance adjustment oil pressure chamber 289. It should be noted that in the automatic transmission 201, the clutch clearance is a value obtained by subtracting a sum of thicknesses of all the friction plates 281a and 281b from a size between the engagement piston 285 and the clearance adjustment piston 286.

The clearance adjustment piston 286 and a cylinder 287 accommodating the clearance adjustment piston 286 are arranged in order in front of the friction plate set 281. The cylinder 287 is constituted by a ring-shaped member having a substantially U-shaped cross section. The cylinder 287 is prevented from rotating in such a manner that an outer peripheral surface portion 287a thereof is fitted in the transmission casing 2, and a projection (not shown) provided at the outer peripheral surface portion 287a is engaged with the transmission casing 2. In addition, the cylinder 87 is prevented from coming out forward by a snap ring 288.

The clearance adjustment piston 286 includes: a base portion 286a extending in the radial direction; and an extending portion 286b extending in the axial direction from the base portion 286a toward the friction plate set side. The clearance adjustment piston 286 is slidably and oil-tightly fitted in the cylinder 287. The clearance adjustment oil pressure chamber 289 is formed by the cylinder 287 and the clearance adjustment piston 286 and is supplied with predetermined clearance adjustment oil pressure.

A plate spring 292 is provided at the clearance adjustment piston 286 so as to contact a protruding portion 286c provided at the base portion 286a. The plate spring 292 serves as a return spring which is fixed to the transmission casing 2 and returns the clearance adjustment piston 286 toward a side opposite to the friction plate set side.

On the other hand, the engagement piston 285 and a cylinder 293 accommodating the engagement piston 285 are arranged in order behind the friction plate set 281. The cylinder 293 is constituted by a ring-shaped member having a substantially U-shaped cross section. The cylinder 293 is prevented from rotating in such a manner that an outer peripheral surface portion 293a thereof is fitted in the transmission casing 2, and a projection (not shown) provided at the outer peripheral surface portion 293a is engaged with the transmission casing 2. In addition, the cylinder 293 is prevented from coming out forward by the snap ring 283 and also prevented from coming out rearward by a snap ring 294.

The engagement piston 285 is slidably and oil-tightly fitted in the cylinder 293. The engagement oil pressure chamber 292 is formed by the cylinder 293 and the engagement piston 285 and is supplied with predetermined engagement oil pressure.

According to the brake device 280, when the clearance adjustment oil pressure is supplied to the clearance adjustment oil pressure chamber 289, the clearance adjustment piston 286 moves toward the friction plate set side. Thus, the predetermined clutch clearance is realized.

When the engagement oil pressure is supplied to the engagement oil pressure chamber 292 in a state where the clearance adjustment oil pressure is supplied to the clearance adjustment oil pressure chamber 289, the engagement piston 285 moves toward the friction plate set side, and the fixation friction plates 281a and the rotation friction plates 281b are sandwiched between the engagement piston 285 and the clearance adjustment piston 286. With this, the brake device 280 is engaged, and the hub member 82 or the ring gear 42 of the first gear set 40 is fixed.

As shown in FIG. 4, the brake device 280 configured as above is arranged at the outer periphery side of the ring gear 62 of the third gear set 60, at the outer periphery side of the ring gear 42 of the first gear set 40, and at the outer periphery side of the ring gear 72 of the fourth gear set 70, the ring gears 42 and 72 being arranged at both respective axial sides of the ring gear 62 of the third gear set 60 and each having the outer diameter smaller than the outer diameter of the ring gear 62. Further, the brake device 280 is arranged at the outer periphery side of the power transmission member 7 extending in the axial direction at the outer periphery side of the ring gear 62 of the third gear set 60.

Specifically, according to the brake device 280, the friction plate set 281 is arranged at the anti-driving source side of the ring gear 62 and the power transmission member 7, and the engagement oil pressure chamber 292 is arranged at the anti-driving source side of the ring gear 62 and the power transmission member 7 and at the anti-driving source side of the friction plate set 281. Further, the clearance adjustment oil pressure chamber 289 is arranged at the driving source side of the ring gear 62 and the power transmission member 7, and the clearance adjustment piston 286 extends from the clearance adjustment oil pressure chamber 289 toward the friction plate set side through the outer periphery side of the ring gear 62 and the power transmission member 7 and the inner periphery side of the transmission casing 2.

According to the brake device 280, the engagement oil pressure chamber 292 is arranged at the anti-driving source side of the ring gear 62 and the power transmission member 1 and at the anti-driving source side of the friction plate set 281, and the clearance adjustment oil pressure chamber 289 is arranged at the driving source side of the ring gear 62 and the power transmission member 7. However, the brake device 280 may be configured such that: the engagement oil pressure chamber 292 is arranged at the driving source side of the ring gear 62 and the power transmission member 7; the clearance adjustment oil pressure chamber 289 is arranged at the anti-driving source side of the ring gear 62 and the power transmission member 7 and at the anti-driving source side of the friction plate set 281; and the engagement piston 285 extends from the engagement oil pressure chamber 292 toward the friction plate set side through the outer periphery side of the ring gear 62 and the power transmission member 7 and the inner periphery side of the transmission casing 2.

As above, in the automatic transmission 201 according to the present embodiment, the friction plate set 281 and oil pressure chambers 289 and 292 of the brake device 280 are arranged at both axial sides of the first rotating members 62 and 7 and at the outer periphery side of the second and third rotating members 42 and 72 each having the outer diameter smaller than the outer diameter of each of the first rotating members 62 and 7, and the piston 286 of the brake device 280 extends from the oil pressure chamber 289 toward the friction plate set side through the outer periphery side of the first rotating members 62 and 7. With this, as compared to a case where the friction plate set 281 and the oil pressure chambers 289 and 292 are adjacently arranged at one axial side of the first rotating members 62 and 7, the automatic transmission 201 can be configured compactly in the axial direction by effectively utilizing spaces at both axial sides of the first rotating members 62 and 7.

The piston of the automatic transmission 201 according to the present embodiment includes the engagement piston 285 and the clearance adjustment piston 286, and the oil pressure chamber of the automatic transmission 201 according to the present embodiment includes the engagement oil pressure chamber 292 and the clearance adjustment oil pressure chamber 289. In addition, one of the engagement oil pressure chamber 292 and the clearance adjustment oil pressure chamber 289 is arranged at one axial side of the first rotating members 62 and 7 and at the outer periphery side of the second rotating member 42, and the other of the engagement oil pressure chamber 292 and the clearance adjustment oil pressure chamber 289 is arranged at the other axial side of the first rotating members 62 and 7 and at the outer periphery side of the third rotating member 72. With this, in the case of using the tandem type brake device, the engagement oil pressure chamber 292 and the clearance adjustment oil pressure chamber 289 can be arranged at spaces at both axial sides of the first rotating members 62 and 7.

It should be noted that the "second gear set 50" corresponds to an "inner periphery side planetary gear set" recited in claims, and the "third gear set 60" corresponds to an "outer periphery side planetary gear set" recited in claims.

The present invention is not limited to the above embodiments, and various improvements and design modifications may be made within the scope of the present invention.

INDUSTRIAL APPLICABILITY

As above, the present invention realizes an automatic transmission configured compactly in an axial direction. Therefore, the present invention may be suitably utilized in an industrial field of manufacturing this type of automatic transmission or a vehicle on which this type of automatic transmission is mounted.

LIST OF REFERENCE CHARACTERS 1, 101, 201 automatic transmission
2 transmission casing
5, 6, 7, 8 power transmission member
40, 50, 60, 70 planetary gear set
41, 51, 61, 71 sun gear
42, 52, 62, 72 ring gear
43, 53, 63, 73 pinion
44, 54, 64, 74 carrier
80, 180, 280 brake device
81, 181, 281 friction plate set
81a, 181a, 281a fixation friction plate
81b, 181b, 281b rotation friction plate
85, 285 engagement piston
86, 286 clearance adjustment piston
89, 289 clearance adjustment oil pressure chamber
92, 292 engagement oil pressure chamber

The invention claimed is:
1. An automatic transmission comprising:
a brake device including
a friction plate set configured such that fixation friction plates and rotation friction plates are alternately arranged,
a piston, and
an oil pressure chamber supplied with oil pressure that moves the piston toward the friction plate set;
a predetermined first rotating member;
a predetermined second rotating member arranged at one axial side of the first rotating member and having an outer diameter smaller than an outer diameter of the first rotating member; and
a predetermined third rotating member arranged at the other axial side of the first rotating member and having an outer diameter smaller than the outer diameter of the first rotating member, wherein:
the friction plate set is arranged at the one axial side of the first rotating member and at an outer periphery side of the second rotating member;
a part of the oil pressure chamber or the entire oil pressure chamber is arranged at the other axial side of the first rotating member and at the outer periphery side of the third rotating member; and
the piston extends from the oil pressure chamber toward the friction plate set across the outer periphery side of the first rotating member.

2. The automatic transmission according to claim 1, comprising:
an inner periphery side planetary gear set; and
an outer periphery side planetary gear set located at the outer periphery side of the inner periphery side planetary gear set, the inner and outer periphery side planetary gear sets each including a sun gear, a ring gear, and a carrier and being arranged so as to overlap each other when viewed from a radial direction, wherein
the first rotating member serves as the ring gear of the outer periphery side planetary gear set.

3. The automatic transmission according to claim 1, comprising:
an inner periphery side planetary gear set;
an outer periphery side planetary gear set located at the outer periphery side of the inner periphery side planetary gear set, the inner and outer periphery side planetary gear sets each including a sun gear, a ring gear, and a carrier and being arranged so as to overlap each other when viewed from a radial direction; and
a power transmission member provided across the outer periphery side of the outer periphery side planetary gear set, wherein
the first rotating member includes the power transmission member.

4. The automatic transmission according to claim 1, wherein:
the piston includes
an engagement piston configured to cause the fixation friction plates and the rotation friction plates to be engaged with each other; and
a clearance adjustment piston configured to adjust a clutch clearance;
the oil pressure chamber includes
an engagement oil pressure chamber supplied with oil pressure that moves the engagement piston toward the friction plate set; and
a clearance adjustment oil pressure chamber supplied with oil pressure that moves the clearance adjustment piston toward the friction plate set;
one of the engagement oil pressure chamber and the clearance adjustment oil pressure chamber is arranged at the one axial side of the first rotating member and at the outer periphery side of the second rotating member; and
the other of the engagement oil pressure chamber and the clearance adjustment oil pressure chamber is arranged at the other axial side of the first rotating member and at the outer periphery side of the third rotating member.

5. The automatic transmission according to claim 1, wherein:

the piston includes
- an engagement piston configured to cause the fixation friction plates and the rotation friction plates to be engaged with each other; and
- a clearance adjustment piston configured to adjust a clutch clearance;

the oil pressure chamber includes
- an engagement oil pressure chamber supplied with oil pressure that moves the engagement piston toward the friction plate set; and
- a clearance adjustment oil pressure chamber supplied with oil pressure that moves the clearance adjustment piston toward the friction plate set; and both the engagement oil pressure chamber and the clearance adjustment oil pressure chamber are arranged at the other axial side of the first rotating member and at the outer periphery side of the third rotating member.

\* \* \* \* \*